United States Patent
Pinewski et al.

(10) Patent No.: US 10,186,900 B2
(45) Date of Patent: Jan. 22, 2019

(54) TECHNIQUES FOR CONTROLLING A/C POWER DISTRIBUTION IN POWERED FURNITURE

(71) Applicant: Ergotron, Inc., St. Paul, MN (US)

(72) Inventors: Thomas Peter Pinewski, Minneapolis, MN (US); Nicholas Simon Hazzard, Minneapolis, MN (US); Jeffrey Aymond, Burnsville, MN (US)

(73) Assignee: Ergotron, Inc., St. Paul, MN (US)

( * ) Notice: Subject to any disclaimer, the term of this patent is extended or adjusted under 35 U.S.C. 154(b) by 141 days.

(21) Appl. No.: 15/441,685

(22) Filed: Feb. 24, 2017

(65) Prior Publication Data
US 2018/0248404 A1 Aug. 30, 2018

(51) Int. Cl.
| | |
|---|---|
| H02J 1/00 | (2006.01) |
| H02J 3/14 | (2006.01) |
| H02J 13/00 | (2006.01) |
| H01R 24/76 | (2011.01) |
| A47B 21/06 | (2006.01) |
| H01R 103/00 | (2006.01) |

(52) U.S. Cl.
CPC .......... *H02J 13/0062* (2013.01); *A47B 21/06* (2013.01); *H01R 24/76* (2013.01); *A47B 2021/066* (2013.01); *H01R 2103/00* (2013.01)

(58) Field of Classification Search
CPC ................ H02J 13/0062; A47B 21/06; A47B 2021/066; H01R 24/76; H01R 2103/00
USPC ........................................................ 307/31
See application file for complete search history.

(56) References Cited

U.S. PATENT DOCUMENTS

| | | |
|---|---|---|
| 4,175,238 A | 11/1979 | Breimesser et al. |
| 4,499,385 A | 2/1985 | Slavik |
| 4,760,276 A | 7/1988 | Lethellier |
| 5,208,485 A | 5/1993 | Krinsky et al. |
| 5,359,540 A | 10/1994 | Ortiz |
| 5,424,903 A | 6/1995 | Schreiber |
| 5,436,788 A | 7/1995 | Wallaert |
| 5,589,718 A | 12/1996 | Lee |

(Continued)

OTHER PUBLICATIONS

"International Application Serial No. PCT US2018 035163, International Search Report dated Aug. 17, 2018", 3 pgs.

(Continued)

*Primary Examiner* — Carlos Amaya
(74) *Attorney, Agent, or Firm* — Schwegman Lundberg & Woessner, P.A.

(57) ABSTRACT

In an example, a method of controlling power distribution in a powered furniture system including a first article of powered furniture having a first controller and a first number of power outlets and a second article of powered furniture having a second number of power outlets and a second controller can include determining a first total number of power outlets in the system, wherein the first total number of power outlets includes at least the first number of power outlets of the first article of powered furniture. The method can include controlling application of power to the first number of power outlets associated with the first article of powered furniture using the determined first total number of power outlets in the system, and transmitting the first total number of power outlets to a second controller of a second article of powered furniture having a second number of power outlets.

21 Claims, 4 Drawing Sheets

(56) References Cited

U.S. PATENT DOCUMENTS

| | | | |
|---|---|---|---|
| 5,604,385 A | 2/1997 | David | |
| 5,637,933 A | 6/1997 | Rawlings et al. | |
| 5,923,103 A | 7/1999 | Pulizzi et al. | |
| 5,967,820 A | 10/1999 | Siegal et al. | |
| 6,031,302 A | 2/2000 | Levesque | |
| 6,211,796 B1 | 4/2001 | Toms et al. | |
| 6,815,842 B2 | 11/2004 | Fehd et al. | |
| 6,857,896 B2 | 2/2005 | Rupert et al. | |
| 7,075,769 B2 | 7/2006 | Rupert et al. | |
| 8,330,056 B2 | 12/2012 | Ty et al. | |
| 8,350,406 B2 | 1/2013 | Byrne et al. | |
| 8,680,709 B2 | 3/2014 | Byrne et al. | |
| 9,166,308 B2 | 10/2015 | Byrne | |
| 9,331,464 B2 | 5/2016 | Ty et al. | |
| 9,438,023 B2 | 9/2016 | Ty et al. | |
| 2003/0194904 A1 | 10/2003 | Rupert et al. | |
| 2008/0280470 A1 | 11/2008 | Byrne | |
| 2011/0088941 A1 | 4/2011 | Ty et al. | |
| 2012/0261988 A1* | 10/2012 | Byrne | H02J 3/00 307/35 |
| 2013/0021720 A1 | 1/2013 | Ty et al. | |
| 2015/0255932 A1 | 9/2015 | Dicks et al. | |

OTHER PUBLICATIONS

"International Application Serial No. PCT US2018 035163, Written Opinion dated Aug. 17, 2018", 8 pgs.

\* cited by examiner

TECHNIQUES FOR CONTROLLING A/C POWER DISTRIBUTION IN POWERED FURNITURE

TECHNICAL FIELD

This disclosure pertains generally, but not by way of limitation, to power distribution techniques.

BACKGROUND

Powered furniture has been growing in popularity in various locations, including workplaces, hospitals, and even schools. By adding access to A/C power directly to powered furniture, including modular workstations, for example, various electronic equipment, including laptops, cell phones, tablets, can be powered.

To be fully functional, powered furniture, including modular workstations, can adapt to the orientation of each classroom, conference room, hospital room, and the like in which they are placed. For example, powered modular workstations can be easily moved to accommodate a large room, e.g., a conference room at a hotel, where the orientation of the room routinely changes depending on its use.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

OVERVIEW

Figure 1:
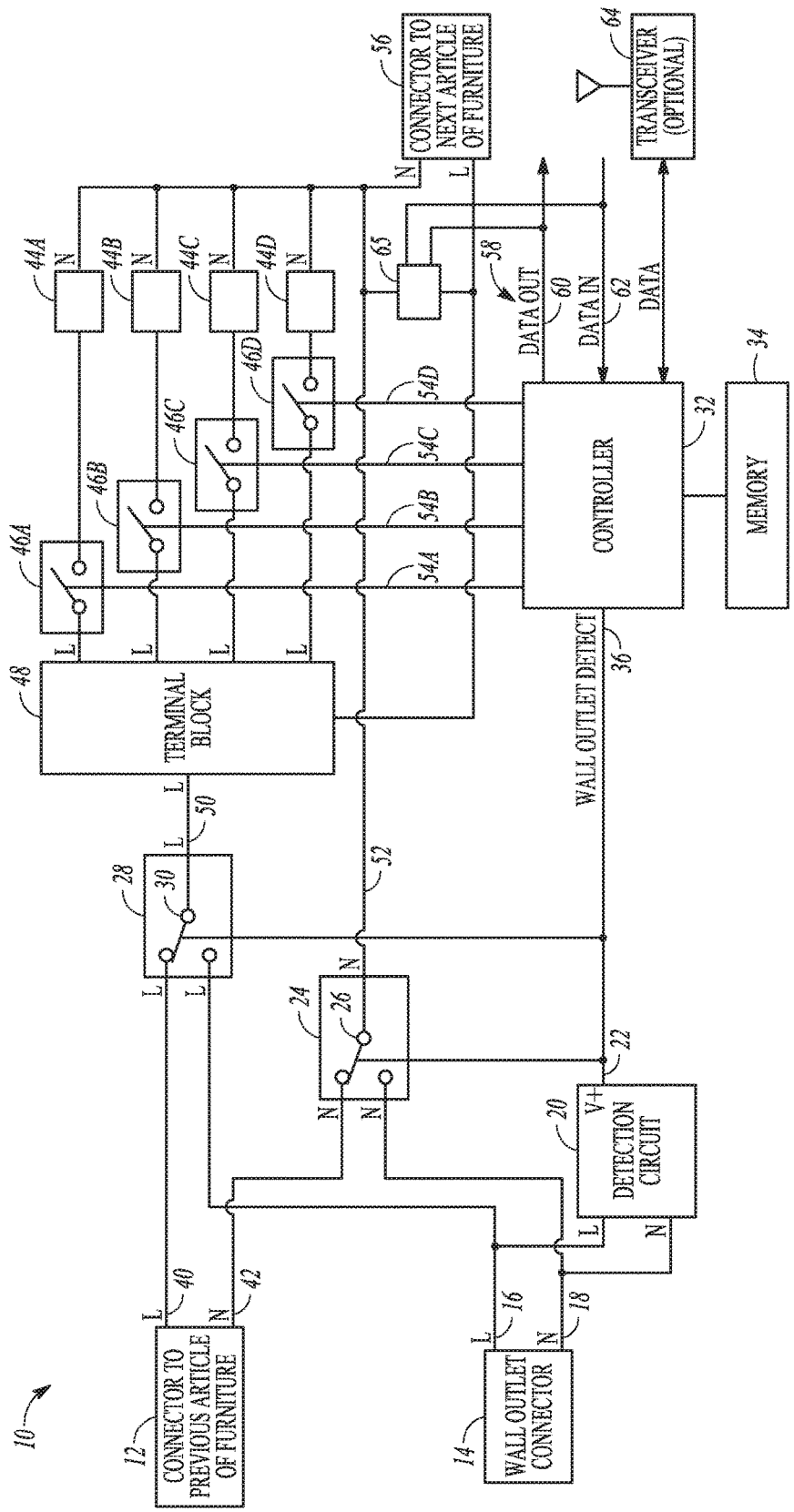
FIG. 1 is a block diagram of an example power distribution system to control power distribution in a powered furniture system, in accordance with this disclosure.

This disclosure is directed to techniques for controlling A/C power distribution in a powered furniture system that can include articles of furniture, e.g., two or more, configured to receive power from a power source. Non-limiting examples of articles of powered furniture can include modular workstations, tables, benches, and the like.

Using various techniques of this disclosure, the various articles of powered furniture can be connected in any order because each article of furniture can be configured to receive power directly from a wall outlet or from another article of furniture in the system.

In some example implementations, this disclosure is directed to a method of controlling power distribution in a powered furniture system including a first article of powered furniture having a first controller and a first number of power outlets and a second article of powered furniture having a second number of power outlets and a second controller. The method comprises determining, using the first controller, a first total number of power outlets in the system, wherein the first total number of power outlets includes at least the first number of power outlets of the first article of powered furniture, and wherein the first number of power outlets includes at least one electrical receptacle; controlling, using the first controller, application of power to the first number of power outlets associated with the first article of powered furniture using the determined first total number of power outlets in the system; and transmitting, using the first controller, the first total number of power outlets to a second controller of a second article of powered furniture having a second number of power outlets.

In some example implementations, this disclosure is directed to a power distribution system to control power distribution in a powered furniture system. The power distribution system comprises a first article of powered furniture including a first controller configured to: determine a first total number of power outlets in the system, wherein the first total number of power outlets includes at least the first number of power outlets of the first article of powered furniture, and wherein the first number of power outlets includes at least one electrical receptacle; control application of power to the first number of power outlets associated with the first article of powered furniture using the determined first total number of power outlets in the system; and transmit the first total number of power outlets to a second controller of a second article of powered furniture having a second number of power outlets.

In some example implementations, this disclosure is directed to a power distribution system to control power distribution in a powered furniture system, the power distribution system including a first article of powered furniture having a first controller and a first number of power outlets and a second article of powered furniture having a second controller and a second number of power outlets. The power distribution system comprises means for determining a first total number of power outlets in the system including at least the first number of power outlets of the first article of powered furniture, wherein the first number of power outlets includes at least one electrical receptacle; means for controlling application of power to the first number of power outlets associated with the first article of powered furniture using the determined first total number of power outlets in the system; and means for transmitting the first total number of power outlets to a second controller of a second article of powered furniture having a second number of power outlets.

DETAILED DESCRIPTION

Powered furniture also referred to in this disclosure as "articles of powered furniture" or "articles of furniture") can be designed to be movable and adaptable. As described in detail below, the powered furniture of this disclosure, including modular workstations, tables, benches, etc., can be connected together in series (or "daisy-chained") such that each article of furniture can draw power from a previous article of furniture in the chain, and the first article of furniture can draw power from a wall outlet.

In some examples, the articles of furniture can be separated and moved, e.g., rolled, across a room and connected in a different order or configuration, and individual articles of furniture can be connected to a different system of powered furniture. Using various techniques of this disclosure, a high level of adaptability can be achieved because each article of powered furniture can control its own power system. For example, there is no master article of furniture controlling all the other powered furniture in the powered furniture systems described in this disclosure. Rather, each article of furniture can recognize the power capability of the system and can act accordingly. There is no need to worry about whether an article of furniture is positioned first, second, third, etc. in a powered system because the powered furniture according to this disclosure can advantageously be connected in any order.

Like other powered items, powered furniture currently must comply with various safety standards. For example, powered furniture currently must comply with Underwriters Laboratories (UL) 962 "Standard for Household and Commercial Furnishings." As currently written, UL 962 essentially states that no more than eight outlets can be daisy chained together in a system of powered furniture, e.g., tables. In some examples, an outlet can be a duplex outlet. In other examples, an outlet can be a triplex outlet. In some examples, an outlet can have between one and three receptacles. In other examples, an outlet can have more than 3 receptacles.

To comply with the current UL 962 standard, a number of example configurations of powered tables, for example, are possible. For example, eight tables, each having one built-in outlet, could be daisy-chained together. As another example, if a table has four built-in outlets, two tables could be daisy-chained together. A problem to be solved is determining how to limit the powered outlets to a maximum of eight even if the user daisy chains together a system with more than eight outlets.

Existing techniques attempt to solve the problem by creating two types of powered furniture, e.g. tables: master tables and slave tables. The first table in a system must be the master table, and each table connected to the master table must be a slave table. The master table is connected to an outlet on the wall and it controls the whole system by turning the slaves on/off.

The solutions discussed in this disclosure surpass existing techniques in adaptability, for example. In accordance with various techniques of this disclosure, the articles of powered furniture, e.g., tables, workstations, and the like, are similarly configured in that each article of furniture is configured to draw power from a wall outlet or from another table. If the article of furniture draws power from the wall outlet, it can be configured to be the first article in the powered furniture system and can be designated as the head or parent article, e.g., parent table or workstation. If the article of powered furniture draws power from another article, then it is designated as a child article, e.g., child table or workstation.

Unlike existing solutions, the techniques of this disclosure allow each article of furniture in the powered furniture system to operate as its own master. For example, a first table in a powered furniture system, also known as the head or parent table, can be connected to a wall outlet. As described in detail below, the first table can determine that it is the first table, e.g., connected to the wall outlet, in the powered furniture system and can control application of power to its associated outlets. A second table in the powered furniture system, also known as a child table, can be electrically connected to the first table. The second table can receive, from the first table, a current total of how many outlets are already powered in the system, e.g., the number of outlets powered in the first table. Then, the second table can determine whether it can turn its own outlets on using the number of already powered outlets.

For example, if eight outlets are allowed per the existing UL 962 standard and the first table has already powered four outlets, the second table can power on a maximum of four outlets to be in compliance. This process can be similar for each additional table after the second table. A third table can receive, from the second table, a current total of how many outlets are powered in the system, e.g., the combined number of outlets already powered in the first table and in the second table. Then, the third table can determine whether it can turn its own outlets on using the combined number of already powered outlets. Continuing the example above, if eight outlets are allowed per the current UL 962 standard and the first table has already powered four outlets and the second table has already powered two outlets, the third table can power on a maximum of two outlets to be in compliance.

Figure 2:
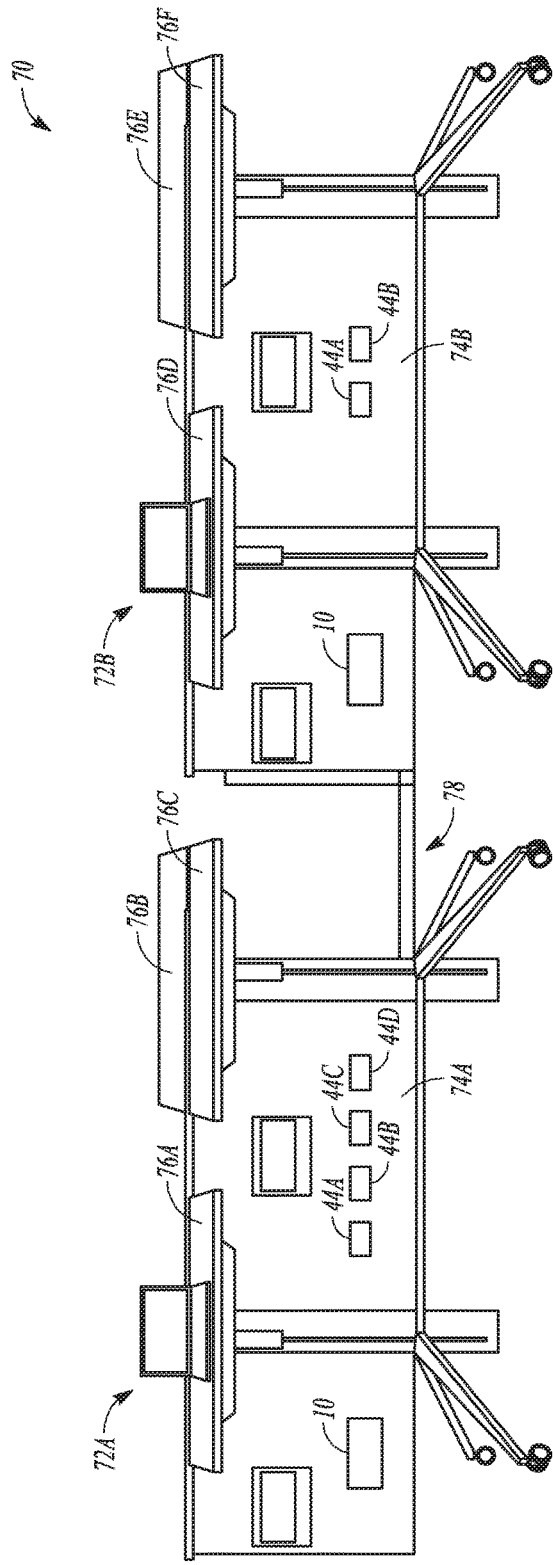
FIG. 2 illustrates an example configuration of a powered furniture system using various techniques of this disclosure.
Figure 3:
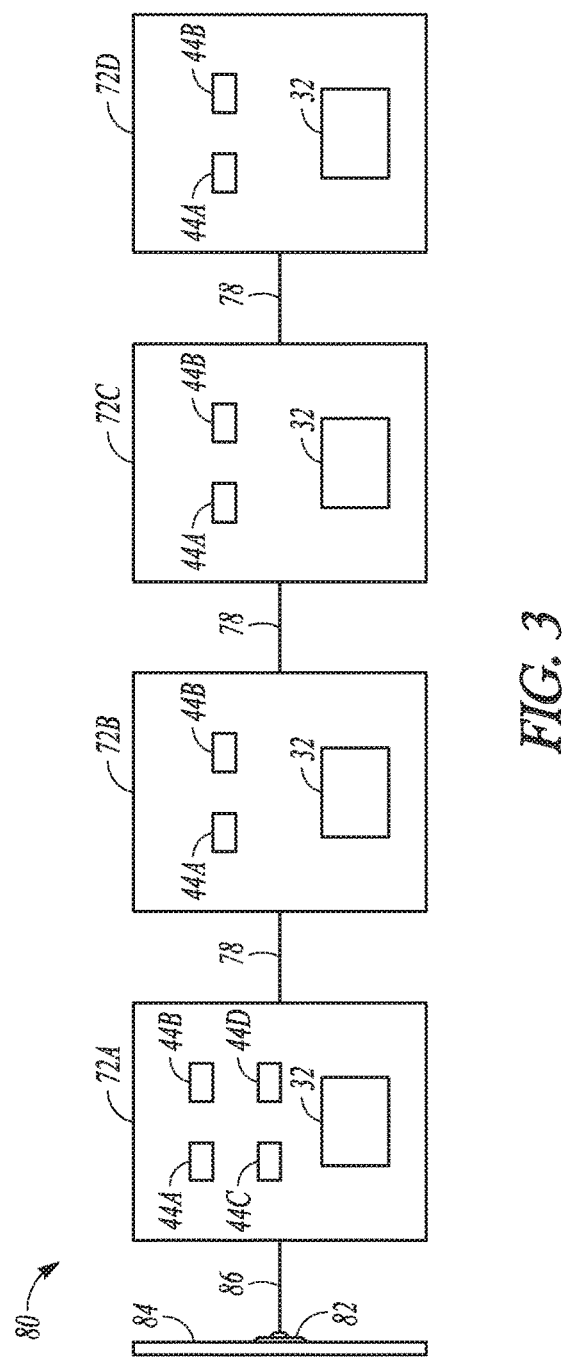
FIG. 3 illustrates another example configuration of a powered furniture system using various techniques of this disclosure.

FIG. 1 is a block diagram of an example power distribution system 10 to control power distribution in a powered furniture system, in accordance with this disclosure. The power distribution system 10 of an article of powered furniture, e.g., a workstation or table, can receive power from a previous article of furniture, e.g., a workstation or table, using connector 12 or from a wall outlet using wall outlet connector 14. A powered furniture system (non-limiting examples are shown in FIGS. 2 and 3) can include one or more articles of furniture configured to receive power and supply the power to the power outlets associated with the respective articles of powered furniture.

The wall outlet connector 14 can include line and neutral power outputs 16, 18. A detection circuit 20 can be connected to the line and neutral power outputs 16, 18 of the wall outlet connector 14. If the article of furniture is connected to a power source, e.g., wall outlet (not depicted in FIG. 1), using the wall outlet connector 14, the detection circuit 20 can output a DC voltage 22, The DC voltage 22 can control a circuit 24, e.g., a relay circuit, to select the neutral output 18 from the wall outlet connector 14, e.g., by energizing a relay coil (not depicted) and closing a contact or switch 26. Similarly, the DC voltage 22 can control a circuit 28, e.g., a relay circuit, to select the line output 16 from the wall outlet connector 14, e.g., by energizing a relay coil (not depicted) and closing a contact or switch 30.

The power distribution system 10 of the article of powered furniture can include a controller 32 coupled to a memory 34. In some examples, the controller 32 can be an embedded processor.

The controller 32 can be coupled to the detection circuit 20 and can receive the DC voltage 22 if the article of furniture is connected to a power source (wall outlet) using the wall outlet connector 14. The received DC voltage 22 can indicate to the controller 32 that the article of furniture, and specifically the wall outlet connector 14, is connected to a wall outlet.

In some example implementations, if the controller 32 receives the DC voltage 22; the controller 32 can recognize that the article of furniture is powered from a wall outlet and, as such, is the first article of furniture in a chain of connected articles of powered furniture. By detecting the DC voltage 22 at input 36, the controller 32 can recognize that there are no upstream articles of furniture in the powered furniture system.

As seen in FIG. 1, the article of furniture can include the connector 12 that can connect the article of furniture to a previous article of furniture in the daisy-chained configuration. The connector 12 can include line and neutral power outputs 40, 42, The line and neutral outputs 40, 42 of the connector 12 can be connected to circuit 28 and circuit 24, respectively. If the article of furniture is connected to a power source (a previous article of furniture) using the connector 12, the detection circuit 20 will not receive AC power and, as such, will not output a DC voltage 22. As such, the circuit 24 can select the neutral output 42 from the connector 12, e.g., using a normally closed contact or switch 26. Similarly, the circuit 28 can select the line output 40 from the connector 12 e.g., using a normally closed contact or switch 30.

It should be noted that the configuration of FIG. 1 can prevent the article of furniture from receiving power from both a wall outlet and a previous article of furniture because the detection of the DC voltage 22 results in the wall outlet connection being prioritized over the connection to the previous article of furniture.

Using various techniques of this disclosure, the controller 32 can control application of power to one or more power outlets 44A-44D (collectively referred to in this disclosure as outlets 44) associated with the article of furniture. Although the example shown in FIG. 1 depicts four outlets 44A-44D, other example configurations can include more (or less) than four outlets. Each of the outlets 44 can include one or more electrical receptacles.

In the example configuration shown in FIG. 1, each outlet 44A-44D can be coupled to a circuit 46A-46D, e.g., a relay. Each circuit 46A-46D can be coupled to a respective line conductor from a terminal block 48. The terminal block 48 can be, for example, an N-way terminal block that includes 1 input connected to the line output 50 of circuit 28 that is split into N outputs. As seen in FIG. 1, four of the terminals of the terminal block can be connected to the four circuits 46A-46D. The neutral terminals of the outlets 44A-44D can be joined together and connected to the neutral conductor 52 from the circuit 24.

The article of furniture and, in particular, the controller 32, can control application of power to one or more of the outlets 44 by outputting one or more control signals on control lines 54A-54D to the respective circuits 46A-46D, e.g., relays. Respective switches or contacts of the circuits 46A-46D can be closed in response to receiving the control signals on control lines 54A-54D.

In the example depicted in FIG. 1, the controller 32 can individually control application of power to the outlets 44A-44D. In other example configurations, the terminal block 48 can be removed, the circuits 46A-46D can be replaced with a single circuit, e.g., single relay, and the line conductor 50 from the circuit 28 can be connected to the single circuit. The controller 32 can then control application of power to all of the outlets 44 rather than on an individual basis.

The system 10 can further include a connector 56 to provide power to a second article of furniture daisy-chained to the first article of furniture, e.g., using a power connection 78 of FIG. 2. As indicated above, the second article of furniture can receive, from the first article of furniture, a current total of how many outlets are powered in the system, including the number of outlets powered in the first article of furniture and any other outlets powered further upstream. Then, a controller of the second article of furniture can determine whether it can turn its own outlets on using the number of already powered outlets.

During manufacture of the article of furniture, for example, each controller 32 of an article of furniture can be programmed with and store, e.g., in a memory circuit 34, data representing a number of outlets associated with the article of furniture. For example, in the configuration shown in FIG. 1, the memory 34 can store data representing that four outlets are associated with the article of furniture. In addition, each controller 32 of an article of furniture can be programmed with and store, in the memory circuit 34, data representing a predetermined maximum number of outlets for a system that can be powered and comply with UL 962, for example, which is currently eight outlets.

The controller 32 can receive, using a communications channel, data representing a number of power outlets in any articles of powered furniture electrically connected upstream in the chain to the first article of powered furniture. In some example implementations, the communications channel can be a wired communications channel. For example, the communications channel can be a series connected communications channel 58, e.g., a daisy-chained channel connected between the articles of furniture, that can include a DATA OUT signal path 60 and a DATA IN signal path 62.

In other example implementations, the communications channel can be a wireless communications channel. For example, the power distribution system 10 can optionally include a wireless transceiver circuit 64 connected to the controller 32 that can transmit data wirelessly between articles of furniture in the powered furniture system.

In other example implementations, the communications channel can include the power lines, e.g., line and neutral power lines, such that the signals can be transmitted on the power lines themselves using power line communication techniques. For example, the system 10 of FIG. 1 can optionally include a power line data transceiver 65 coupled to both the line and neutral conductors as well as to the DATA OUT signal path 60 and the DATA IN signal path 62 in this manner, the transceiver can couple data to or decouple data from the line and neutral conductors.

FIG. 2 illustrates an example configuration of a powered furniture system 70 using various techniques of this disclosure. Each article of furniture in the powered furniture system 70 of FIG. 2 can include a power distribution system 10 (of FIG. 1) to control power distribution in the powered furniture system 70, as described in detail above.

FIG. 2 illustrates an example of two articles of powered furniture, in particular, two workstation assemblies 72A, 72B that can include panels 74A, 74B that can be connected. The panels 74A, 74B of the workstation assemblies 72A, 72B can be connected to provide a plurality of height adjustable worksurfaces 76A-76F to accommodate a number of users. The panels 74A, 72B can be physically connected together, and electrical systems of each workstation assembly 72A, 72B can also be connected.

Electrical power can be transferred from a workstation assembly 72A to another workstation assembly 72B by a power connection 78, e.g., using a connector 12 of FIG. 1. The power connection 78 can include all necessary power or network wiring and connectors needed for any type of computer, communications, and/or electrical connection. Additional workstations (not depicted) can be added so that the workstations can be connected in a daisy-chain configuration.

Each workstation assembly 72A, 72B can include the power distribution system 10 of FIG. 1 to control power distribution in the powered furniture system 70, including one or more outlets 44A-44D. In the non-limiting example configuration shown in FIG. 2, the workstation 72A includes four outlets 44A-44D, and the workstation 72B includes two outlets 44A-44B.

FIG. 3 illustrates another example configuration of a powered furniture system 80 using various techniques of this disclosure. Each of the powered furniture articles in FIG. 3 can include a power distribution system 10 of FIG. 1 to control power distribution in the powered furniture system 80.

The non-limiting example of FIG. 3 depicts four articles of powered furniture in the powered furniture system 80, e.g., workstations 72A-72D, such as shown in FIG. 2. In other examples, there could be more (or less) than four articles of powered furniture in the system 80, and the powered furniture could be tables, benches, and/or other furniture.

In the example configuration shown in FIG. 3, a first workstation 72A having four outlets 44A-44D can be connected to a wall outlet 82 of a wall 84 via power cord 86. A second workstation 72B having two outlets 44A, 44B is electrically connected to and configured to receive power from the first article of furniture 72A. A third workstation 72C having two outlets 44A, 44B is electrically connected to and configured to receive power from the second workstation 72B. A fourth workstation 72D having two outlets 44A, 44B is electrically connected to and configured to receive power from the third workstation 72C. As such, the workstations 72A-72D are electrically connected in a daisy-chain configuration.

To comply with a wiring standard, e.g., UL 962, for example, which is currently a maximum of eight outlets, the controller 32 of the workstation 72A can determine a first total number of power outlets in the system. The first total number of power outlets in the system can include all of the power outlets in one or more articles of furniture connected upstream in the daisy-chain (if any), and the number of outlets in the article of powered furniture associated with the controller 32 of the workstation 72A. In the example configuration shown in FIG. 3, there are no upstream connected workstations. The controller 32 of the workstation 72A can receive the DC voltage 22 and can recognize that the workstation is powered from a wall outlet and, as such, determine that it is the first article of furniture in the chain. As the first workstation in the chain, the controller 32 of the workstation 72A can control application of power to all of its outlets 44A-44D.

The controller 32 of the workstation 72A can transmit the total number of powered outlets to the second controller 32 of the second workstation 72B. In this case, the controller 32 of the workstation 72A can transmit data representing the four outlets that it powered.

The controller 32 of the second workstation 72B can receive, using its communications channel 58 of FIG. 1, data representing all of the power outlets in one or more articles of furniture electrically connected upstream in the daisy-chain (if any), Here, the controller 32 of the second workstation 72B can receive data representing the four outlets of the workstation 72A.

Then, the controller 32 of the second workstation 72B can sum the data representing the number of power outlets associated with the second workstation 72B, e.g., stored in the memory 34 of FIG. 1, and the data representing all of the power outlets in one or more workstations electrically connected upstream in the daisy-chain to determine a second total number of power outlets in the system. Here, the controller 32 of the second workstation 72B can retrieve from the memory 34 data representing its two power outlets and the controller 32 of the second workstation 72B can sum the number of power outlets received (four) and determine a second total number of power outlets to be six power outlets.

The controller 32 of the second workstation 72B can control application of power to its two power outlets using the determined second total number of power outlets in the system. Continuing with the specific example above, the controller 32 of the second workstation 72B determined that the second total number of power outlets was six power outlets (including its two outlets and the four outlets from the first workstation 72A). The controller 32 of the second workstation 72B can compare the second total number of power outlets (six outlets) to the predetermined maximum number retrieved from memory 34 (currently eight outlets, per UL 962). Because the second total number of power outlets of six outlets does not exceed the predetermined maximum number of eight outlets, the controller 32 of the second workstation 72B can allow application of power to at least one of power outlets 44A, 44B of its associated article of powered furniture.

Next, the controller 32 of the second workstation 72B can transmit the total number of powered outlets to the third controller 32 of the third workstation 72C. In this case, the controller 32 of the workstation 72B can transmit data representing the six outlets that are powered in the system.

The controller 32 of the third workstation 72C can receive, using its communications channel 58 of FIG. 1, data representing all of the power outlets in workstations electrically connected upstream in the daisy-chain. Here, the controller 32 of the third workstation 72C can receive data representing the six outlets from the first workstation 72A and the second workstation 72B.

Then, the controller 32 of the third workstation 72C can sum the data representing the number of power outlets associated with the third workstation 72C, e.g., stored in the memory 34 of FIG. 1, and the data representing all of the power outlets in the first workstation 72A and the second workstation 72B to determine a total number of power outlets in the system. Here, the controller 32 of the third workstation 72C can retrieve from the memory 34 data representing its two power outlets and the controller 32 of the third workstation 72C can sum the number of power outlets received (six) and determine a third total number of power outlets to be eight power outlets. The controller 32 of the third workstation 72C can compare the third total number of power outlets (eight outlets) to the predetermined maximum number retrieved from memory 34 (currently eight outlets, per UL 962). Because the third total number of power outlets of eight outlets does not exceed the predetermined maximum number of eight outlets, the controller 32 of the third workstation 72C can allow application of power to at least one of the number of power outlets 44 of its associated article of powered furniture.

Next, the controller 32 of the third workstation 72C can transmit the total number of powered outlets to the controller 32 of the fourth workstation 72D. In this case, the controller 32 of the third workstation 72C can transmit data representing the eight outlets that are powered in the system.

The controller 32 of the fourth workstation 721) can receive, using its communications channel 58 of FIG. 1, data representing the eight outlets from the first workstation 72A, the second workstation 72B, and the third workstation 72C.

Then, the controller 32 of the fourth workstation 72D can sum the data representing the number of power outlets associated with the fourth workstation 72D, e.g., stored in the memory 34 of FIG. 1, and the data representing all of the power outlets in the first workstation 72A, the second workstation 72B, and the third workstation 72C to determine a total number of power outlets in the system. Here, the controller 32 of the fourth workstation 72D can retrieve from the memory 34 data representing its two power outlets and the controller 32 of the fourth workstation 72D can sum the number of power outlets received (eight) and determine a third total number of power outlets to be ten power outlets. The controller 32 of the fourth workstation 72D can compare the total number of power outlets (ten outlets) to the predetermined maximum number retrieved from memory 34 (currently eight outlets, per UL 962). Because the total number of power outlets of ten outlets exceeds the predetermined maximum number of eight outlets, the controller 32 of the fourth workstation 72D will not allow application of power to any of the number of power outlets 44 of its associated article of powered furniture.

Figure 4:
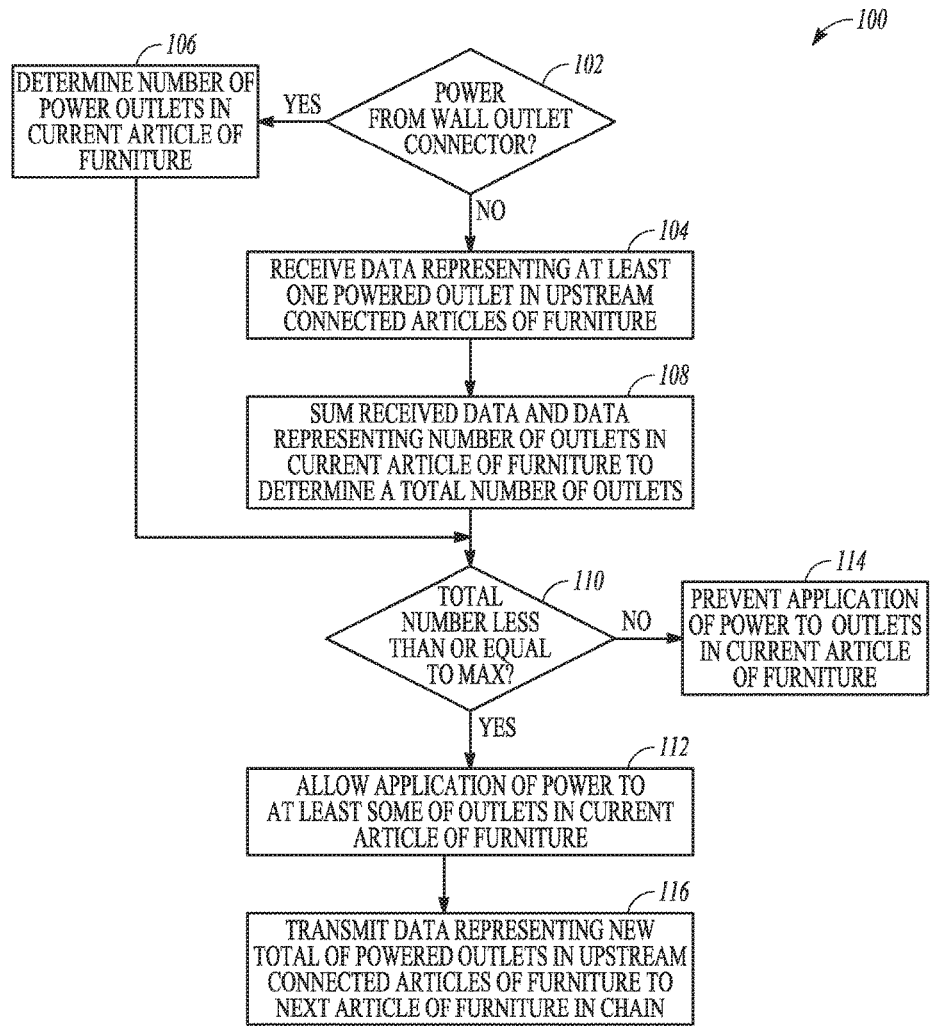
FIG. 4 is an example of a method that can implement various techniques of this disclosure.

FIG. 4 is an example of a method 100 that can implement various techniques of this disclosure. At block 102, an article of furniture, e.g., the second workstation 72B of FIG. 3, can determine whether it is receiving power via a wall outlet connector, e.g., wall outlet connector 14 of FIG. 1, as described above with respect to FIG. 1. If the article of furniture is not receiving power via the wall outlet connector ("NO" branch of block 102), then the method can move to block 104. If the article of furniture is receiving power via the wall outlet connector ("YES" branch of block 102), then at block 106 the article of furniture can determine its number of power outlets and proceed to block 110. For example, the controller 32 can retrieve from the memory circuit 34 of FIG. 1 data representing the number of its power outlets.

At block 104, an article of furniture, e.g., the second workstation 72B of FIG. 3, can receive data representing at least one powered outlet in one or more upstream connected articles of furniture. For example, a controller 32 of workstation 72B can receive, using a communications channel 58 of FIG. 1, data representing the four powered outlets 44A-44D in upstream connected first workstation 72A of FIG. 3.

At block 108, the controller 32 of the second workstation 72B can sum the received data, e.g., data representing the four outlets, and the data representing the number of outlets in the second workstation 72B, e.g., the data representing the two outlets, to determine a total number of outlets.

At block 110, the controller 32 of the second workstation 72B can compare the total number of power outlets (six outlets) to the predetermined maximum number retrieved from memory 34 (currently eight outlets, per UL 962). If the total number is less than or equal to the predetermined maximum ("YES" branch of block 110), then the controller 32 of the second workstation 72B can allow application of power to at least some of the outlets associated with the second workstation 72B (block 112). If the total number is not less than or equal to the predetermined maximum ("NO" branch of block 110), then the controller 32 of the second workstation 72B can prevent application of power to the outlets associated with the second workstation 72B (block 114).

At block 116, the controller 32 can transmit data representing a new total of powered outlets in the one or more upstream connected articles of furniture to the next (downstream) article of furniture in the chain.

Using the various techniques described above, a high level of adaptability can be achieved because each article of powered furniture can control its own power system. There is no master article of furniture controlling all the powered furniture in the powered furniture systems described in this disclosure. Rather, each article of can recognize the power capability of the system and can act accordingly to power or not its associated power outlets.

Additional Notes and Aspects

Aspect 1 includes subject matter (such as a method, means for performing acts, machine readable medium including instructions that when performed by a machine cause the machine to performs acts, or an apparatus to perform) of controlling power distribution in a powered furniture system including a first article of powered furniture having a first controller and a first number of power outlets and a second article of powered furniture having a second number of power outlets and a second controller, the subject matter comprising: determining, using the first controller, a first total number of power outlets in the system, wherein the first total number of power outlets includes at least the first number of power outlets of the first article of powered furniture, and wherein the first number of power outlets includes at least one electrical receptacle; controlling, using the first controller, application of power to the first number of power outlets associated with the first article of powered furniture using the determined first total number of power outlets in the system; and transmitting, using the first controller, the first total number of power outlets to a second controller of a second article of powered furniture having a second number of power outlets.

In Aspect 2, the subject matter of Aspect 1 may optionally include wherein determining, using a first controller, a first total number of power outlets in the system includes: receiving, using a communications channel, data representing a third number of power outlets in a third article of powered furniture electrically connected to the first article of powered furniture; and summing data representing the first number of power outlets associated with the first article of powered furniture and the data representing the third number of power outlets in the third article of powered furniture to determine the first total number of power outlets.

In Aspect 3, the subject matter of Aspect 2 may optionally include, wherein controlling, using the first controller, application of power to the first number of power outlets associated with the first article of powered furniture using the determined first total number of power outlets in the system includes: comparing the first total number of power outlets in the system to a predetermined maximum number of power outlets; and using the comparison, allowing application of power to at least one of the first number of power outlets associated with the first article of powered furniture when the first total number of power outlets does not exceed the predetermined maximum number.

In Aspect 4, the subject matter of Aspect 2 may optionally include wherein receiving, using a communications channel, data representing a third number of power outlets in a third article of powered furniture electrically connected to the first article of powered furniture includes: receiving, using a wired or wireless communication channel, data representing a third number of power outlets configured to receive power in a third article of powered furniture electrically connected to the first article of powered furniture.

In Aspect 5, the subject matter of Aspect 2 may optionally include, wherein receiving, using a communications channel, data representing a third number of power outlets in a third article of powered furniture electrically connected to the first article of powered furniture includes: receiving, using a series connected communications channel, data representing a third number of power outlets configured to receive power in a third article of powered furniture electrically connected to the first article of powered furniture.

In Aspect 6, the subject matter of Aspect 2 may optionally include, wherein receiving, using a communications channel, data representing a third number of power outlets in a third article of powered furniture electrically connected to the first article of powered furniture includes: receiving, using a power line communications transceiver, data representing a third number of power outlets configured to receive power in a third article of powered furniture electrically connected to the first article of powered furniture.

In Aspect 7, the subject matter one or more of Aspects 1-6 may optionally include, determining a source of power of the first article of powered furniture in the system.

In Aspect 8, the subject matter one or more of Aspects 1-7 may optionally include, wherein determining a source of power of the first article of powered furniture in the system includes: determining whether the first article of powered furniture of the system is connected to power directly from a wall outlet or connected to power from a third article of powered furniture of the system.

In Aspect 9, the subject matter of Aspect 8 may optionally include, upon determining that the first article of powered furniture of the system is connected to power directly from a wall outlet: configuring a circuit to receive power from the wall outlet; and configuring the circuit to prevent power from being received from the third article of powered furniture of the system.

In Aspect 10, the subject matter one or more of Aspects 1-9 may optionally include, receiving, using the communications channel, data representing the first total number of power outlets in the system; determining, using the second controller, a second total number of power outlets in the system, wherein the second total number of power outlets includes at least the second number of power outlets of the second article of powered furniture, including: summing data representing the second number of power outlets associated with the second article of powered furniture and the data representing the first total number of power outlets to determine the second total number of power outlets.

Aspect 11 includes subject matter (such as an apparatus, device, or system) to control power distribution in a powered furniture system, the subject matter comprising: a first article of powered furniture including a first controller configured to: determine a first total number of power outlets in the system, wherein the first total number of power outlets includes at least the first number of power outlets of the first article of powered furniture, and wherein the first number of power outlets includes at least one electrical receptacle; control application of power to the first number of power outlets associated with the first article of powered furniture using the determined first total number of power outlets in the system; and transmit the first total number of power outlets to a second controller of a second article of powered furniture having a second number of power outlets.

In Aspect 12, the subject matter of Aspect 11 may optionally include, wherein the first controller configured to determine a first total number of power outlets in the system including at least the first number of power outlets of the first article of powered furniture, wherein the first number of power outlets includes at least one electrical receptacle is configured to: receive, using a communications channel, data representing a third number of power outlets in a third article of powered furniture electrically connected to the first article of powered furniture; and sum data representing the first number of power outlets associated with the first article of powered furniture and the data representing the third number of power outlets in the third article of powered furniture to determine the first total number of power outlets.

In Aspect 13, the subject matter of Aspect 12 may optionally include, wherein the first controller configured to control application of power to the first number of power outlets associated with the first article of powered furniture using the determined first total number of power outlets in the system is configured to: compare the first total number of power outlets in the system to a predetermined maximum number of power outlets; and using the comparison, allow application of power to at least one of the first number of power outlets associated with the first article of powered furniture when the first total number of power outlets does not exceed the predetermined maximum number.

In Aspect 14, the subject matter of Aspect 12 may optionally include, wherein the first controller configured to receive, using a communications channel, data representing a third number of power outlets in a third article of powered furniture electrically connected to the first article of powered furniture is configured to: receive, using a wired or wireless communication channel, data representing a third number of power outlets configured to receive power in a third article of powered furniture electrically connected to the first article of powered furniture.

In Aspect 15, the subject matter of Aspect 12 may optionally include, wherein the first controller configured to receive, using a communications channel, data representing a third number of power outlets in a third article of powered furniture electrically connected to the first article of powered furniture is configured to: receive, using a series connected communications channel, data representing a third number of power outlets configured to receive power in a third article of powered furniture electrically connected to the first article of powered furniture.

In Aspect 16, the subject matter one or more of Aspects 11-15 may optionally include, wherein the first article of powered furniture includes a first circuit configured to determine a source of power of the first article of powered furniture in the powered furniture system.

In Aspect 17, the subject matter one or more of Aspects 11-16 may optionally include, wherein the first circuit configured to determine a source of power of the first article of powered furniture in the powered furniture system is configured to: determine whether the first article of powered furniture of the system is connected to power directly from a wall outlet or connected to power from a third article of powered furniture of the system.

In Aspect 18, the subject matter of Aspect 17 may optionally include, wherein the first circuit configured to determine a source of power of the first article of powered furniture in the powered furniture system is further configured to: upon determining that the first article of powered furniture of the system is connected to power directly from a wall outlet: configure the first circuit to receive power from the wall outlet; and configure the first circuit to prevent power from being received from the third article of powered furniture of the system.

In Aspect 19, the subject matter one or more of Aspects 11-18 may optionally include, wherein at least one of the first article of powered furniture and the second article of powered furniture is a table.

In Aspect 20, the subject matter one or more of Aspects 11-19 may optionally include, wherein at least one of the first article of powered furniture and the second article of powered furniture is a modular workstation.

Aspect 21 includes subject matter to control power distribution in a powered furniture system, the power distribution system including a first article of powered furniture having a first controller and a first number of power outlets and a second article of powered furniture having a second controller and a second number of power outlets, the subject matter comprising: means for determining a first total number of power outlets in the system including at least the first number of power outlets of the first article of powered furniture, wherein the first number of power outlets includes at least one electrical receptacle; means for controlling application of power to the first number of power outlets associated with the first article of powered furniture using the determined first total number of power outlets in the system; and means for transmitting the first total number of power outlets to a second controller of a second article of powered furniture having a second number of power outlets.

The above detailed description includes references to the accompanying drawings, which form a part of the detailed description. The drawings show, by way of illustration, specific embodiments in which the invention can be practiced. These embodiments are also referred to herein as "examples" or "aspects". Such examples or aspects can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

In some embodiments, various techniques of this disclosure can be implemented using pre-defined logic that performs a specific logic function, in addition to or instead of sequentially executed code. For example, various aspects of this disclosure can be implemented at least in part by dedicated circuitry or logic that is permanently configured to perform certain operations, including, for example, a special-purpose processor, such as a field programmable gate array (FPGA) or an ASIC.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A method of controlling power distribution in a powered furniture system including a first article of powered furniture having a first controller and a first number of power outlets and a second article of powered furniture having a second number of power outlets and a second controller, the method comprising:
   determining, using the first controller; a first total number of power outlets in the system, wherein the first total number of power outlets includes at least the first number of power outlets of the first article of powered furniture, and wherein the first number of power outlets includes at least one electrical receptacle;
   controlling, using the first controller, application of power to the first number of power outlets associated with the first article of powered furniture using the determined first total number of power outlets in the system; and
   transmitting, using the first controller, the first total number of power outlets to a second controller of a second article of powered furniture having a second number of power outlets.

2. The method of claim 1, wherein determining, using a first controller, a first total number of power outlets in the system includes:
   receiving, using a communications channel, data representing a third number of power outlets in a third article of powered furniture electrically connected to the first article of powered furniture; and
   summing data representing the first number of power outlets associated with the first article of powered furniture and the data representing the third number of power outlets in the third article of powered furniture to determine the first total number of power outlets.

3. The method of claim 2, wherein controlling, using the first controller, application of power to the first number of power outlets associated with the first article of powered furniture using the determined first total number of power outlets in the system includes:
   comparing the first total number of power outlets in the system to a predetermined maximum number of power outlets; and
   using the comparison, allowing application of power to at least one of the first number of power outlets associated with the first article of powered furniture when the first total number of power outlets does not exceed the predetermined maximum number.

4. The method of claim 2, wherein receiving, using a communications channel, data representing a third number of power outlets in a third article of powered furniture electrically connected to the first article of powered furniture includes:

receiving, using a wired or wireless communication channel, data representing a third number of power outlets configured to receive power in a third article of powered furniture electrically connected to the first article of powered furniture.

5. The method of claim 2, wherein receiving, using a communications channel, data representing a third number of power outlets in a third article of powered furniture electrically connected to the first article of powered furniture includes:
receiving, using a series connected communications channel, data representing a third number of power outlets configured to receive power in a third article of powered furniture electrically connected to the first article of powered furniture.

6. The method of claim 2, wherein receiving, using a communications channel, data representing a third number of power outlets in a third article of powered furniture electrically connected to the first article of powered furniture includes:
receiving, using a power line communications transceiver, data representing a third number of power outlets configured to receive power in a third article of powered furniture electrically connected to the first article of powered furniture.

7. The method of claim 1, further comprising:
determining a source of power of the first article of powered furniture in the system.

8. The method of claim 1, wherein determining a source of power of the first article of powered furniture in the system includes:
determining whether the first article of powered furniture of the system is connected to power directly from a wall outlet or connected to power from a third article of powered furniture of the system.

9. The method of claim 8, further comprising:
upon determining that the first article of powered furniture of the system is connected to power directly from a wall outlet;
configuring a circuit to receive power from the wall outlet; and
configuring the circuit to prevent power from being received from the third article of powered furniture of the system.

10. The method of claim 1, further comprising:
receiving, using the communications channel, data representing the first total number of power outlets in the system;
determining, using the second controller, a second total number of power outlets in the system, wherein the second total number of power outlets includes at least the second number of power outlets of the second article of powered furniture, including:
summing data representing the second number of power outlets associated with the second article of powered furniture and the data representing the first total number of power outlets to determine the second total number of power outlets.

11. A power distribution system to control power distribution in a powered furniture system, the power distribution system comprising:
a first article of powered furniture including a first controller configured to:
determine a first total number of power outlets in the system, wherein the first total number of power outlets includes at least the first number of power outlets of the first article of powered furniture, and wherein the first number of power outlets includes at least one electrical receptacle;
control application of power to the first number of power outlets associated with the first article of powered furniture using the determined first total number of power outlets in the system; and
transmit the first total number of power outlets to a second controller of a second article of powered furniture having a second number of power outlets.

12. The power distribution system of claim 11, wherein the first controller configured to determine a first total number of power outlets in the system including at least the first number of power outlets of the first article of powered furniture, wherein the first number of power outlets includes at least one electrical receptacle is configured to:
receive, using a communications channel, data representing a third number of power outlets in a third article of powered furniture electrically connected to the first article of powered furniture; and
sum data representing the first number of power outlets associated with the first article of powered furniture and the data representing the third number of power outlets in the third article of powered furniture to determine the first total number of power outlets.

13. The power distribution system of claim 12, wherein the first controller configured to control application of power to the first number of power outlets associated with the first article of powered furniture using the determined first total number of power outlets in the system is configured to:
compare the first total number of power outlets in the system to a predetermined maximum number of power outlets; and
using the comparison, allow application of power to at least one of the first number of power outlets associated with the first article of powered furniture when the first total number of power outlets does not exceed the predetermined maximum number.

14. The power distribution system of claim 12, wherein the first controller configured to receive, using a communications channel, data representing a third number of power outlets in a third article of powered furniture electrically connected to the first article of powered furniture is configured to:
receive, using a wired or wireless communication channel, data representing a third number of power outlets configured to receive power in a third article of powered furniture electrically connected to the first article of powered furniture.

15. The power distribution system of claim 12, wherein the first controller configured to receive, using a communications channel, data representing a third number of power outlets in a third article of powered furniture electrically connected to the first article of powered furniture is configured to:
receive, using a series connected communications channel, data representing a third number of power outlets configured to receive power in a third article of powered furniture electrically connected to the first article of powered furniture.

16. The power distribution system of claim 11, wherein the first article of powered furniture includes a first circuit configured to determine a source of power of the first article of powered furniture in the powered furniture system.

17. The power distribution system of claim 11, wherein the first circuit configured to determine a source of power of the first article of powered furniture in the powered furniture system is configured to:

determine whether the first article of powered furniture of the system is connected to power directly from a wall outlet or connected to power from a third article of powered furniture of the system.

18. The power distribution system of claim 17, wherein the first circuit configured to determine a source of power of the first article of powered furniture in the powered furniture system is further configured to:

upon determining that the first article of powered furniture of the system is connected to power directly from a wall outlet:

configure the first circuit to receive power from the wall outlet; and configure the first circuit to prevent power from being received from the third article of powered furniture of the system.

19. The system of claim 11, wherein at least one of the first article of powered furniture and the second article of powered furniture is a table.

20. The system of claim 11, wherein at least one of the first article of powered furniture and the second article of powered furniture is a modular workstation.

21. A power distribution system to control power distribution in a powered furniture system, the power distribution system including a first article of powered furniture having a first controller and a first number of power outlets and a second article of powered furniture having a second controller and a second number of power outlets, the power distribution system comprising:

means for determining a first total number of power outlets in the system including at least the first number of power outlets of the first article of powered furniture, wherein the first number of power outlets includes at least one electrical receptacle;

means for controlling application of power to the first number of power outlets associated with the first article of powered furniture using the determined first total number of power outlets in the system; and means for transmitting the first total number of power outlets to a second controller of a second article of powered furniture having a second number of power outlets.

* * * * *